US010100395B2

(12) United States Patent
Hirata et al.

(10) Patent No.: US 10,100,395 B2
(45) Date of Patent: Oct. 16, 2018

(54) HIGH-STRENGTH PLATED STEEL PLATE FOR WELDED STRUCTURAL MEMBER, AND METHOD FOR PRODUCING THE SAME

(71) Applicant: NISSHIN STEEL CO., LTD., Tokyo (JP)

(72) Inventors: Kentaro Hirata, Hiroshima (JP); Yukio Katagiri, Hiroshima (JP); Shigeru Morikawa, Hiroshima (JP); Masaaki Uranaka, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 336 days.

(21) Appl. No.: 14/775,733

(22) PCT Filed: Mar. 13, 2014

(86) PCT No.: PCT/JP2014/056620
§ 371 (c)(1),
(2) Date: Sep. 14, 2015

(87) PCT Pub. No.: WO2014/156671
PCT Pub. Date: Oct. 2, 2014

(65) Prior Publication Data
US 2016/0032438 A1 Feb. 4, 2016

(30) Foreign Application Priority Data

Mar. 26, 2013 (JP) .................................. 2013-064370

(51) Int. Cl.
*B32B 15/00* (2006.01)
*C23C 2/06* (2006.01)
(Continued)

(52) U.S. Cl.
CPC .............. *C23C 2/06* (2013.01); *B32B 15/013* (2013.01); *C21D 8/0236* (2013.01);
(Continued)

(58) Field of Classification Search
None
See application file for complete search history.

(56) References Cited

FOREIGN PATENT DOCUMENTS

| JP | 2004-315848 | 11/2004 |
|----|---|---|
| JP | 2006-307260 | 11/2006 |

(Continued)

*Primary Examiner* — Daniel J. Schleis
(74) *Attorney, Agent, or Firm* — Clark & Brody

(57) ABSTRACT

A high-strength plated steel plate for a welded structural member having a steel composition containing from 0.050 to 0.150% of C, from 0.001 to 1.00% of Si, from 1.00 to 2.50% of Mn, from 0.005 to 0.050% of P, from 0.001 to 0.020% of S, and from 0.005 to 0.100% of Al, having a steel base material having a metal structure containing a ferrite phase and a second phase containing mainly martensite having an average crystal grain diameter of 8 mm or less, and having a chemical composition and a thickness t (mm) of the steel base material regulated to obtain a value, $C/0.2+Si/5.0+Mn/1.3+Cr/1.0+Mo/1.2+0.4t-0.7(Cr+Mo)^{1/2}$, of 2.9 or less. The high-strength plated steel plate is excellent in corrosion resistance of the welded portion, resistance to liquid metal embrittlement cracking, and bending workability.

2 Claims, 2 Drawing Sheets

(51) Int. Cl.
- C23C 2/40 (2006.01)
- C21D 9/46 (2006.01)
- C22C 18/04 (2006.01)
- C22C 38/00 (2006.01)
- C22C 38/38 (2006.01)
- C23C 2/02 (2006.01)
- C23C 2/26 (2006.01)
- C23C 2/28 (2006.01)
- B32B 15/01 (2006.01)
- C22C 38/02 (2006.01)
- C22C 38/04 (2006.01)
- C22C 38/06 (2006.01)
- C22C 38/12 (2006.01)
- C22C 38/14 (2006.01)
- C22C 38/22 (2006.01)
- C22C 38/28 (2006.01)
- C22C 38/32 (2006.01)
- C21D 8/02 (2006.01)
- C22C 38/26 (2006.01)

(52) U.S. Cl.
CPC ........ *C21D 8/0247* (2013.01); *C21D 8/0263* (2013.01); *C21D 8/0278* (2013.01); *C21D 9/46* (2013.01); *C22C 18/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/38* (2013.01); *C23C 2/02* (2013.01); *C23C 2/26* (2013.01); *C23C 2/28* (2013.01); *C23C 2/40* (2013.01); *C21D 2211/002* (2013.01); *C21D 2211/005* (2013.01); *C21D 2211/008* (2013.01)

(56) References Cited

FOREIGN PATENT DOCUMENTS

| JP | 2007-092126 | | 4/2007 |
|---|---|---|---|
| JP | 2007-231369 | | 9/2007 |
| JP | 2007-277729 | | 10/2007 |
| JP | 2009-172679 | | 8/2009 |
| JP | 2009-179852 | | 8/2009 |
| JP | 2009-228079 | | 10/2009 |
| JP | 2009-249733 | | 10/2009 |
| JP | 2011-132602 | | 7/2011 |
| JP | 2011132602 | * | 7/2011 |
| JP | 2012-193452 | | 10/2012 |

* cited by examiner

[Fig.1]
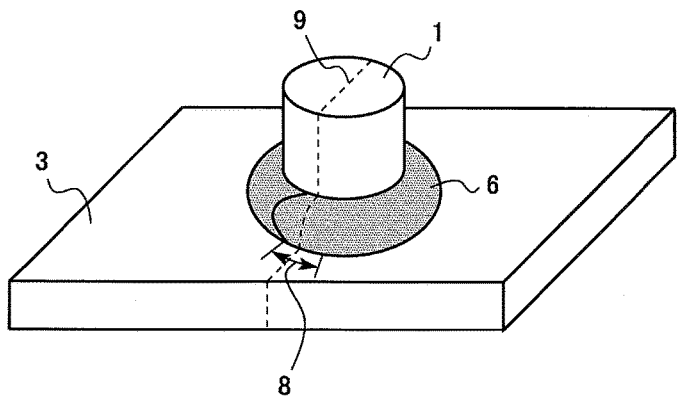
[Fig.2]
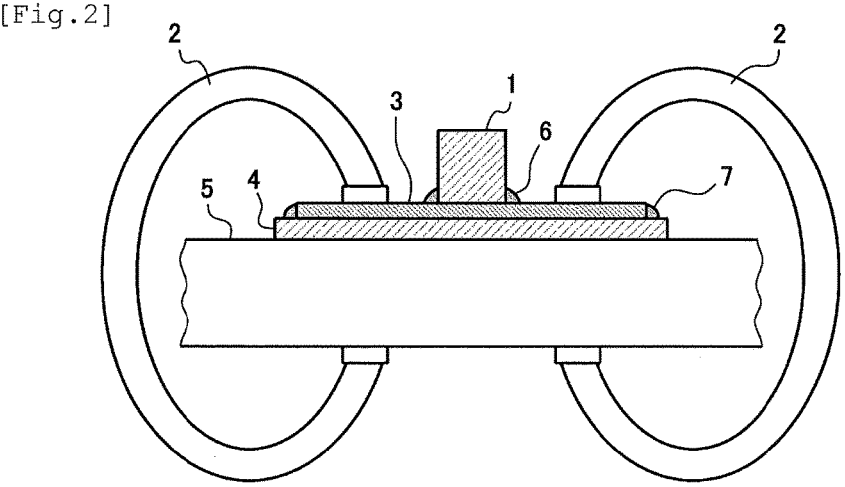
[Fig.3]
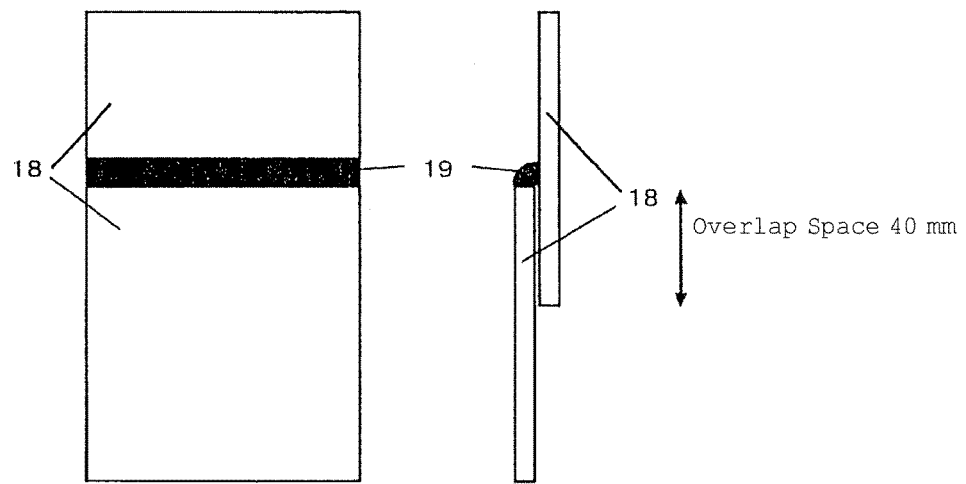

[Fig.4]
CYCLIC CORROSION TEST (CCT) CONDITIONS (JASO M606-91)
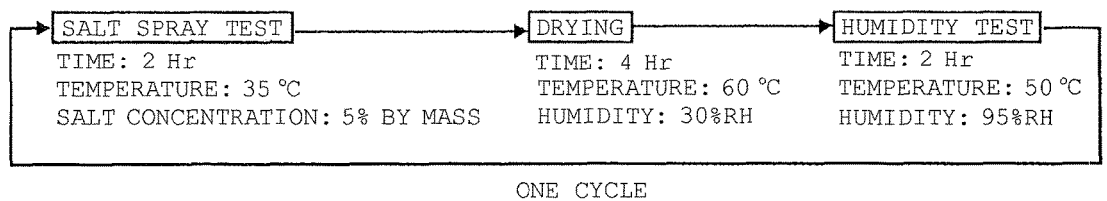
ONE CYCLE
[Fig.5]
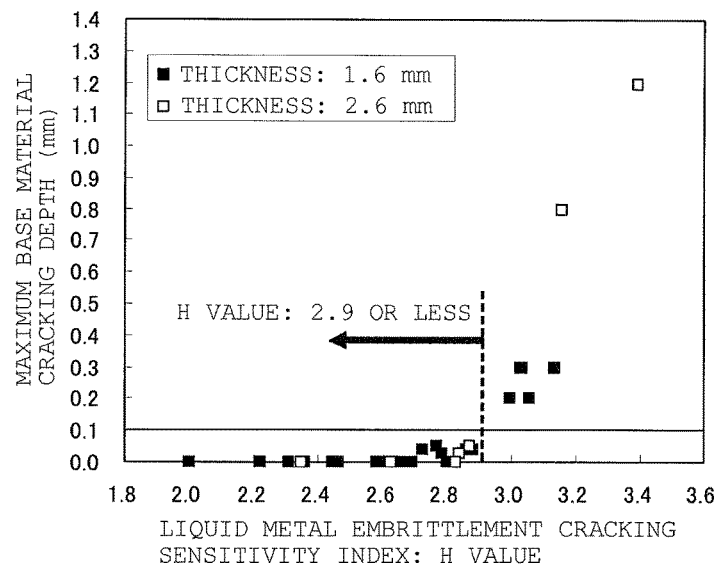

HIGH-STRENGTH PLATED STEEL PLATE FOR WELDED STRUCTURAL MEMBER, AND METHOD FOR PRODUCING THE SAME

TECHNICAL FIELD

The present invention relates to a high-strength hot-dip Zn—Al—Mg based alloy plated steel plate for a welded structural member fabricated by arc welding, particularly suitable for an automobile underbody member, and a method for producing the same.

BACKGROUND ART

An automobile underbody member, such as a suspension member, is ordinarily fabricated in such a manner that a hot-rolled steel plate is formed into steel plate members having prescribed shapes by press forming or the like, and the members are joined by arc welding and then subjected to cationic electrodeposition coating for use.

In the case where a hot-rolled steel plate having a cationic electrodeposition coating undergoes damage on the coating due to chipping by a flying pebble, corrosion may proceed from the damage. Furthermore, on arc welding, an Fe scale is formed due to the heat input of welding on the surface of the base material in the vicinity of the weld bead toe, and the cationic electrodeposition coating may be peeled off along with the Fe scale as the underlayer due to vibration of a running automobile in some cases, in which corrosion of the base material may proceed at the peeled off position. Accordingly, it is necessary to design the strength of the automobile underbody member by taking the reduction in thickness due to corrosion into calculation. Specifically, a hot-rolled steel plate having a thickness of from 2 to 3 mm of a steel species having a tensile strength of from 340 to 440 MPa has been frequently used from the standpoint of the collision safety.

According to the demand of further enhancement of the collision safety and weight reduction in recent years, there has been an increasing need of the use of a high-strength steel plate having a strength of 590 MPa or more as a steel plate for an underbody member. Furthermore, enhancement of the rust prevention capability is also demanded for prolonging the lifetime. In recent years, moreover, good ductility and good bending workability have been also demanded for a steel plate for an underbody member from the standpoint of the formability.

PTL 1 describes a high-strength hot-dip galvannealed steel plate excellent in bending property. However, in the case where a zinc-based alloy plated steel plate is subjected to arc welding, the plated layer may be lost due to evaporation particularly in the vicinity of the weld bead toe, which is exposed to a high temperature, and an Fe scale may be formed at that portion. Thus, the problem of the ordinary hot-rolled steel plate mentioned above, i.e., peeled off of the coating along with the Fe scale is likely to occur, is not solved by the use of a zinc-based alloy plated steel plate.

A hot-dip Zn—Al—Mg based alloy plated steel plate has been known as a plated steel plate that has higher corrosion resistance than an ordinary hot-dip galvanized steel plate, and has been applied to various purposes. By using a hot-dip Zn—Al—Mg based alloy plated steel plate as an underbody member, the functions inherent to the Zn—Al—Mg based alloy plating, for example, a film with high protecting capability derived from the plating components is easily formed even in the case where the coating is peeled off along with the Fe scale formed on arc welding, may be exhibited and thus the corrosion resistance in the vicinity of the weld bead toe maybe be largely improved in comparison to a member using an ordinary hot-dip galvanized steel plate. However, in the case where a hot-dip Zn—Al—Mg based alloy plated steel plate is welded, there is a problem that liquid metal embrittlement cracking is liable to occur in comparison to an ordinary galvanized steel plate. The liquid metal embrittlement cracking is such a phenomenon that the plated metal in a molten state on the surface of the base material immediately after arc welding penetrates into the crystal grain boundary of the base material, which is applied with a tensile stress, so as to cause cracking of the base material on cooling.

PTL 2 describes a Zn—Al—Mg based alloy plated steel plate improved in resistance to liquid metal embrittlement cracking. However, the plated steel plate described in PTL 2 may not be necessarily satisfactory in bending workability. As a result of investigations made by the present inventors, it is considered that the plated steel plate described in PTL 2 has, as the metal structure of the steel base material, a two-phase structure of ferrite as the main phase and martensite, and improvement of the bending workability may be made difficult since the crystal grain diameters of ferrite and martensite are not sufficiently small.

CITATION LIST

Patent Literature

PTL 1: JP-A-2007-231369
PTL 2: JP-A-2009-228079

SUMMARY OF INVENTION

Technical Problem

It is the current situation that in a Zn—Al—Mg based alloy plated steel plate having a high strength of 780 MPa or more, it is difficult to improve both the resistance to liquid metal embrittlement cracking and the bending workability simultaneously, and no effective technique therefor has been developed. An object of the invention is to provide a high-strength Zn—Al—Mg based alloy plated steel plate that is excellent in the corrosion resistance of the welded portion, the resistance to liquid metal embrittlement cracking, and the bending workability.

Solution to Problem

The object may be achieved by a high-strength plated steel plate for a welded structural member, containing a steel base material having on a surface thereof a hot-dip Zn—Al—Mg based alloy plated layer, the steel base material containing from 0.050 to 0.150% of C, from 0.001 to 1.00% of Si, from 1.00 to 2.50% of Mn, from 0.005 to 0.050% of P, from 0.001 to 0.020% of S, from 0.005 to 0.100% of Al, from 0.01 to 0.10% of Ti, from 0.0005 to 0.0100% of B, from 0 to 0.10% of Nb, from 0 to 0.10% of V, from 0 to 1.00% of Cr, from 0 to 1.00% of Mo, and from 0.001 to 0.005% of N, all in terms of percentage by mass, with the balance of Fe and unavoidable impurities, having a chemical composition in which relationship between the contents of the alloy elements and a thickness t (mm) of the steel base material is regulated so as to obtain an H value defined by the following expression (1) of 2.9 or less, and having a metal structure containing a ferrite phase and a second phase having an area ratio of 15% or more and less than 45%, the second phase being constituted by martensite or by martensite and bainite, and the second phase having an average crystal grain diameter of 8 μm or less:

$$H \text{ value}=C/0.2+Si/5.0+Mn/1.3+Cr/1.0+Mo/1.2+0.4t-0.7\,(Cr+Mo)^{1/2} \qquad (1)$$

wherein in the expression (1), the element symbols each represent the content of the corresponding element in the steel in terms of percentage by mass.

The plated layer preferably has a composition containing from 3.0 to 22.0% of Al, from 0.05 to 10.0% of Mg, from 0 to 0.10% of Ti, from 0 to 0.05% of B, from 0 to 2.0% of Si, and from 0 to 2.0% of Fe, all in terms of percentage by mass, with the balance of Zn and unavoidable impurities.

As a method for producing the plated steel plate above, there is provided a method for producing a high-strength plated steel plate for a welded structural member, containing subjecting a steel slab to steps of hot rolling, pickling, cold rolling, annealing, and hot-dip plating, sequentially, so as to produce a plated steel plate containing a steel base material having on a surface thereof a hot-dip Zn-Al-Mg based alloy plated layer, the steel slab having a chemical composition containing from 0.050 to 0.150% of C, from 0.001 to 1.00% of Si, from 1.00 to 2.50% of Mn, from 0.005 to 0.050% of P, from 0.001 to 0.020% of S, from 0.005 to 0.100% of Al, from 0.01 to 0.10% of Ti, from 0.0005 to 0.0100% of B, from 0 to 0.10% of Nb, from 0 to 0.10% of V, from 0 to 1.00% of Cr, from 0 to 1.00% of Mo, and from 0.001 to 0.005% of N, all in terms of percentage by mass, with the balance of Fe and unavoidable impurities, in the cold rolling, assuming that a thickness after the cold rolling is t (mm), the cold rolling reduction ratio being from 45 to 70%, and the H value defined by the expression (1) being 2.9 or less, and the annealing and the hot-dip plating being performed in a continuous plating line, the hot-dip plating bath having, for example, the aforementioned composition of the plated layer, and the annealing being performed under such conditions that the material is heated to a temperature of from 740 to 860° C., and then an average cooling rate at least from 740° C. to 650° C. in a cooling process until immersing in a plating bath is 5° C. per second or more, so as to regulate a metal structure of the steel base material after the hot-dip plating to contain a ferrite phase and a second phase having an area ratio of 15% or more and less than 45%, the second phase being constituted by martensite or by martensite and bainite, and the second phase having an average crystal grain diameter of 8 μm or less.

Advantageous Effects of Invention

According to the invention, a high-strength Zn—Al—Mg based alloy plated steel plate that is excellent in the corrosion resistance of the welded portion, the resistance to liquid metal embrittlement cracking, and the bending workability may be industrially provided stably. In particular, the simultaneous improvement of both the resistance to liquid metal embrittlement cracking and the bending workability may be achieved, which has been said to be difficult. Accordingly, the invention may contribute particularly to the enhancement of durability and the enhancement of degree of design freedom of an automobile underbody member, such as a suspension member.

BRIEF DESCRIPTION OF DRAWINGS

FIG. 1 is an illustration schematically showing an appearance of a welded structural member that is welded for evaluating liquid metal embrittlement cracking property.

FIG. 2 is a cross sectional view schematically showing a fixing method of a test piece in a welding test.

FIG. 3 is an illustration schematically showing a shape of a test piece for evaluating corrosion resistance of a welded portion.

FIG. 4 is a diagram showing a test method for evaluating corrosion resistance.

FIG. 5 is a graph showing relationship between a liquid metal embrittlement cracking sensitivity index, H value, and a maximum base material cracking depth.

DESCRIPTION OF EMBODIMENTS

Chemical Structure of Steel Base Material

The percentages for the chemical composition of the steel base material hereinafter mean percentages by mass unless otherwise indicated.

Content Ranges of Elements

C: 0.050 to 0.150%

C is an element that is essential for enhancing the strength of the steel plate. When the C content is less than 0.050%, it may be difficult to provide a tensile strength of 780 MPa or more stably. When the C content exceeds 0.150%, the structure may become significantly non-uniform, which may deteriorate the bending workability. Accordingly, the C content is from 0.050 to 0.150%.

Si: 0.001 to 1.00%

Si is effective for enhancing the strength, and Si also has a function of suppressing cementite from being precipitated and is effective for suppressing pearlite and the like from being formed in the steel. For providing these functions, the Si content is necessarily 0.001% or more, and is more effectively 0.005% or more. However, a steel that contains a large amount of Si may form a Si concentrated layer on the surface of the steel material, which may deteriorate the platability. Accordingly, the Si content is in a range of 1.00% or less.

Mn: 1.00 to 2.50%

Mn stabilizes austenite and simultaneously suppresses pearlite from being formed on cooling after heating, which contributes to the formation of martensite. When the Mn content is less than 1.00%, it may be difficult to ensure the amount of martensite that is necessary for providing a high strength of 780 MPa or more. However, when the Mn content exceeds 2.50%, a band structure may be significantly formed to provide a non-uniform structure, which may deteriorate the bending workability. Accordingly, the Mn content is from 1.00 to 2.50%.

P: 0.005 to 0.050%

P is an element that deteriorates the weldability and the like, and thus the amount thereof is preferably small. However, excessive dephosphorizing may increase the load in the steel making process, and thus a steel having a P content of from 0.005 to 0.050% is used in the invention.

S: 0.001 to 0.020%

S forms a sulfide, such as MnS, and when a large amount of the sulfide is formed, the sulfide may be a factor of deteriorating the bending property. As a result of investigations, the S content is necessarily 0.020% or less, and is more preferably 0.010% or less. However, excessive desulfurizing may increase the load in the steel making process, and thus a steel having a S content of from 0.001 to 0.020% is used in the invention.

Al: 0.005 to 0.100%

Al is an element that is effective as a deoxidizing agent, and the content thereof is preferably 0.005% or more.

However, a large amount of Al may be a factor of deteriorating the bending property, and thus the Al content is 0.100% or less.

Ti: 0.01 to 0.10%

Ti has high affinity with N and fixes N in the steel as TiN, and thus the addition of Ti may suppress N in the steel from being bonded to B. Accordingly, the addition of Ti is significantly effective for ensuring the amount of B that enhances the resistance to liquid metal embrittlement cracking. Ti is also an element that enhances the uniformity of the structure through refinement of the structure, and contributes to enhancement of the strength without deterioration of the bending property, through precipitation strengthening of a carbide. For providing these functions sufficiently, the amount of Ti added is necessarily 0.01% or more. However, the addition thereof exceeding 0.10% may considerably increase the recrystallization temperature. Accordingly, the Ti content is from 0.01 to 0.10%.

B: 0.0005 to 0.0100%

B is an element that is segregated at the crystal grain boundary to increase the interatomic bonding force and is effective for suppressing the liquid metal embrittlement cracking. For providing the functions, 0.0005% or more of B is necessarily contained. However, when the B content exceeds 0.0100%, there may be cases where deterioration of the workability through formation of a boride may cause a problem. Accordingly, the B content is from 0.0005 to 0.0100%.

Nb: 0 to 0.10%, V: 0 to 0.10%

Nb and V are elements that, as similar to Ti, enhance the uniformity of the structure through refinement of the structure, and contribute to enhancement of the strength without deterioration of the bending property, through precipitation strengthening of a carbide. Accordingly, one or both of Nb and V may be added depending on necessity. In this case, the Nb content is more effectively 0.01% or more, and the V content is more effectively 0.03% or more. In the case where these elements are added, the contents of Ti and V added each may be in a range of 0.10% or less.

Cr: 0 to 1.00%, Mo: 0 to 1.00%

Cr and Mo exhibit, as similar to B, a function of suppressing the liquid metal embrittlement cracking through segregation at the austenite grain boundary in the heat affected zone in the cooling process of arc welding. Accordingly, one or both of Cr and Mo may be added depending on necessity. In this case, the Cr content is more effectively 0.10% or more, and the Mo content is more effectively 0.05% or more. In the case where these elements are added, the contents of Cr and Mo added each may be in a range of 1.00% or less.

N: 0.001 to 0.005%

N is effective for strengthening the steel but is liable to form BN through bonding with B. The formation of BN is not preferred since it may bring about consumption of B in the form of solid solution, which is effective for enhancing the resistance to liquid metal embrittlement cracking. As a result of various investigations, the N content is restricted to a range of from 0.001 to 0.005%.

H Value $$H\ value = C/0.2 + Si/5.0 + Mn/1.3 + Cr/1.0 + Mo/1.2 + 0.4t - 0.7(Cr+Mo)^{1/2} \quad (1)$$

The H value represented by the expression (1) is the sensitivity index of liquid metal embrittlement cracking with respect to the contents of the component elements (% by mass) of the steel base material and the thickness t (mm) of the steel base material as parameters. A material having a large H value suffers a large maximum cracking depth formed through the liquid metal embrittlement cracking. In the invention, the H value is determined as 2.9 or less. In the expression (1), the element symbols each represent the content (% by mass) of the corresponding element in the steel.

The liquid metal embrittlement cracking is such a phenomenon that the plated metal in a molten state on the surface of the base material immediately after welding penetrates into the crystal grain boundary of the base material, which is applied with a tensile stress, so as to cause cracking of the base material on cooling. Accordingly, for suppressing the liquid metal embrittlement cracking, it is effective to reduce the tensile stress formed in the heat affected zone of the base material, in a temperature range where the plated layer is in a molten state after welding (which is approximately 400° C. or more). The tensile stress is caused by heat contraction upon cooling. In the invention, the heat contraction in a temperature range where the plating metal is melted is compensated as much as possible by utilizing the volume expansion occurring with the martensitic transformation upon cooling, and thereby the tensile stress formed in the base material until the plating metal is solidified is reduced.

The parameters determining the H value include the terms of the contents of C, Si, Mn, Cr and Mo among the component elements of the steel base material. These elements have a function of shifting the starting temperature of the martensitic transformation in the cooling process of welding to the low temperature side. The parameters of the component elements in the expression (1) are for providing the martensitic transformation occurring in a temperature range where the plated metal is in a molten state (which is approximately 400° C. or more) by regulating the contents of the elements.

The extent of the tensile stress caused by the heat contraction of the steel base material is largely influenced by the thickness of the steel base material. The increase of the thickness may increase the tensile stress due to the increase of the deformation resistance. Accordingly, the parameters determining the H value include the term depending on the thickness t.

The expression (1) is the expression of the sensitivity index of liquid metal embrittlement cracking that has been obtained by experimentations using many steel species within the component ranges. As a result of detailed investigations, it has been found that when the chemical composition is regulated in relationship to the thickness of the steel base material so as to make the H value represented by the expression (1) of 2.9 or less, the liquid metal embrittlement cracking on arc welding of a hot-dip Zn—Al—Mg based alloy plated steel plate is considerably suppressed.

Metal Structure of Steel Base Material

In the invention, as the steel base material, a DP (dual phase) steel plate having a composite structure containing a ferrite main phase having dispersed therein martensite, or martensite and bainite as the second phase may be applied. The martensite or the martensite and bainite as the second phase dispersed in the ferrite main phase have an area ratio of 15% or more and less than 45%. When the area ratio of the second phase is less than 15%, it may be difficult to provide a tensile strength of 780 MPa or more stably. When the area ratio is 45% or more, on the other hand, the material may be too hard, resulting in the deterioration of the workability. The second phase is most preferably formed only of martensite, and may comprise partially dispersed bainite. For example, the volume ratio of bainite in the total volume of martensite and bainite is preferably in a range of from 0 to 5%. The inventive examples in the examples described later all satisfy the range.

In the invention, the bending property is enhanced through refinement of the structure. In consideration of the case where an automobile underbody member is produced by using a plated steel plate having a thickness of approximately from 1.0 to 2.6 mm, it has been found that the sufficient bending property is ensured to make the material effective for enhancing the degree of design freedom when the average crystal grain diameter of the second phase is refined to 8 μm or less. The ferrite as the main phase is also preferably refined, but the average crystal grain diameter of the second phase is important for the bending property. The ferrite phase may be also sufficiently refined by employing the production conditions described later providing the second phase having an average crystal grain diameter of 8 μm or less. For example, the average crystal grain diameter of the ferrite phase may be 10 μm or less thereby. The inventive examples in the examples described later that have an average crystal grain diameter of the second phase of 8 μm or less all have an average crystal grain diameter of the ferrite phase of 10 μm or less.

Production Method

The hot-dip Zn—Al—Mg based alloy plated steel plate may be produced by an ordinary production line for a hot-dip zinc-based alloy plated steel plate, in which a steel slab is subjected to steps of hot rolling, pickling, cold rolling, annealing, and hot-dip plating, sequentially. The strength and the resistance to liquid metal embrittlement cracking of the steel material may be controlled mainly by the chemical composition of the steel base material. In this case, the production conditions are necessarily regulated such that the crystal grain diameter is sufficiently refined, for improving the bending property. Specifically, the cold rolling reduction ratio in the cold rolling step is from 45 to 70%, and thereafter the material is heated to a temperature of from 740 to 860° C., and then an average cooling rate at least from 740° C. to 650° C. in the cooling process until immersing in a plating bath is 5° C. per second or more.

Cold Rolling

In the cold rolling step (i.e., the cold rolling step for providing a cold-rolled steel plate that is to be subjected to the annealing before immersing in the hot-dip plating bath), the cold rolling reduction ratio is from 45 to 70%. When the cold rolling reduction ratio is less than 45%, the bending property may be deteriorated due to the coarse structure after the annealing. When the cold rolling reduction ratio exceeds 70%, on the other hand, the effect of refinement of the structure by cold rolling may be saturated. It is not preferred to apply an excessively large cold rolling reduction ratio since the load in the cold rolling step may be increased. The thickness after the hot rolling may be regulated corresponding to the final target thickness to provide the cold rolling reduction in the cold rolling step within the aforementioned range. An intermediate cold rolling step and an intermediate annealing step may be inserted depending on necessity after the hot rolling step and before the cold rolling step.

Annealing

In the annealing step performed immediately before immersing the material in the hot-dip plating bath, the material is heated to a temperature (maximum temperature) of from 740 to 860° C. When the temperature does not reach 740° C., an unrecrystallized structure is liable to remain due to the insufficient recrystallization, and it may be difficult to provide good bending property stably. When the temperature exceeds 860° C., the crystal grains of the austenite parent phase may be coarse, and the refinement of the second phase, which is necessary for imparting good bending property, may be insufficient. The period of time during which the temperature of the material is retained in a range of from 740 to 860° C. may be, for example, in a range of 60 seconds or less.

In the cooling process after annealing, the average cooling rate at least from 740° C. to 650° C. is 5° C. per second or more. When the cooling rate in the temperature range is smaller than the rate, pearlite is liable to be formed partially, and it may be difficult to provide a high strength of 780 MPa or more stably. A cooling rate of 5° C. per second or more is also effective for the refinement of the ferrite grain diameter and the second phase grain diameter. The steel which is a target of the invention contains the prescribed amount of Ti and contains Nb depending on necessity, and thus the selection of the cooling rate after heating as described above may provide a refined structure having an average crystal grain diameter of the ferrite of 10 μm or less and an average crystal grain diameter of the second phase of 8 μm or less.

The annealing is preferably performed with a continuous plating line, in which the annealing and the hot-dip plating are performed by passing the material to the line only one time. In the cooling process after annealing, the material may be cooled to a temperature that is suitable for immersing in the hot-dip plating bath, and then the material is immersed directly in the hot-dip plating bath. The atmosphere for the annealing may be a reductive atmosphere to prevent the material from being exposed to the air until immersing in the plating bath.

Hot-Dip Plating

The hot-dip Zn—Al—Mg based alloy plating may be performed by an ordinary method. The plating bath preferably has a composition, for example, containing from 3.0 to 22.0% of Al, from 0.05 to 10.0% of Mg, from 0 to 0.10% of Ti, from 0 to 0.05% of B, from 0 to 2.0% of Si, and from 0 to 2.0% of Fe, all in terms of percentage by mass, with the balance of Zn and unavoidable impurities. The plated layer of the resulting plated steel plate may have a composition that substantially reflects the composition of the plating bath.

EXAMPLE

Slabs having the chemical compositions shown in Table 1 were hot-rolled at a heating temperature of 1,250° C., a finishing rolling temperature of 880° C. and a coiling temperature of from 470 to 550° C. to provide hot-rolled steel plates having a thickness of from 2.7 to 5.3 mm.

TABLE 1

| | Chemical composition (% by mass) | | | | | | | | | | | | | Thickness | | |
|---|---|---|---|---|---|---|---|---|---|---|---|---|---|---|---|---|
| Steel | C | Si | Mn | P | S | Al | Ti | B | Nb | V | Cr | Mo | N | (mm) | H value | Note |
| A | 0.110 | 0.40 | 2.00 | 0.020 | 0.002 | 0.043 | 0.03 | 0.0032 | — | — | 0.40 | — | 0.003 | 1.6 | 2.77 | Inventive |
| B | 0.095 | 0.10 | 2.00 | 0.020 | 0.003 | 0.045 | 0.03 | 0.0030 | — | — | — | — | 0.002 | | 2.67 | steel |

TABLE 1-continued

| | Chemical composition (% by mass) | | | | | | | | | | | | | Thickness | | |
|---|---|---|---|---|---|---|---|---|---|---|---|---|---|---|---|---|
| Steel | C | Si | Mn | P | S | Al | Ti | B | Nb | V | Cr | Mo | N | (mm) | H value | Note |
| C | 0.110 | 0.15 | 2.05 | 0.022 | 0.005 | 0.036 | 0.04 | 0.0020 | — | — | — | — | 0.004 | | 2.80 | |
| D | 0.060 | 0.10 | 2.20 | 0.018 | 0.003 | 0.033 | 0.05 | 0.0030 | — | — | — | — | 0.004 | | 2.65 | |
| E | 0.120 | 0.50 | 2.00 | 0.017 | 0.002 | 0.044 | 0.04 | 0.0025 | — | — | 0.50 | — | 0.003 | | 2.88 | |
| F | 0.115 | 0.05 | 1.90 | 0.017 | 0.002 | 0.043 | 0.03 | 0.0028 | — | — | — | — | 0.003 | | 2.69 | |
| G | 0.080 | 0.08 | 1.80 | 0.017 | 0.002 | 0.043 | 0.03 | 0.0032 | 0.04 | — | — | — | 0.003 | | 2.44 | |
| H | 0.125 | 0.03 | 1.75 | 0.018 | 0.003 | 0.033 | 0.04 | 0.0030 | — | — | — | — | 0.003 | | 2.62 | |
| I | 0.143 | 0.20 | 1.18 | 0.022 | 0.005 | 0.044 | 0.08 | 0.018 | 0.05 | — | — | — | 0.004 | | 2.30 | |
| J | 0.130 | 0.82 | 1.65 | 0.022 | 0.008 | 0.036 | 0.06 | 0.0006 | — | — | — | — | 0.004 | | 2.72 | |
| K | 0.075 | 0.30 | 1.20 | 0.023 | 0.002 | 0.033 | 0.02 | 0.0033 | 0.08 | — | — | — | 0.003 | | 2.00 | |
| L | 0.083 | 0.09 | 1.40 | 0.016 | 0.002 | 0.045 | 0.04 | 0.0029 | — | — | 0.85 | — | 0.003 | | 2.35 | |
| M | 0.110 | 0.23 | 2.05 | 0.025 | 0.003 | 0.055 | 0.03 | 0.0031 | — | — | — | — | 0.002 | | 2.81 | |
| N | 0.115 | 0.20 | 2.10 | 0.035 | 0.003 | 0.033 | 0.04 | 0.0033 | — | — | 0.22 | 0.12 | 0.002 | | 2.78 | |
| O | 0.120 | 0.13 | 2.10 | 0.017 | 0.003 | 0.033 | 0.04 | 0.0032 | — | — | 0.45 | — | 0.002 | | 2.86 | |
| P | 0.080 | 0.25 | 1.78 | 0.020 | 0.003 | 0.045 | 0.03 | 0.0030 | — | 0.08 | — | — | 0.003 | | 2.46 | |
| Q | 0.104 | 0.007 | 2.03 | 0.017 | 0.003 | 0.043 | 0.03 | 0.0033 | — | — | — | — | 0.003 | | 2.72 | |
| R | 0.077 | 0.11 | 1.85 | 0.022 | 0.003 | 0.038 | 0.03 | 0.0028 | — | — | — | — | 0.003 | 2.6 | 2.87 | |
| S | 0.080 | 0.13 | 1.60 | 0.018 | 0.005 | 0.044 | 0.06 | 0.0045 | 0.04 | — | 0.33 | — | 0.002 | | 2.62 | |
| T | 0.080 | 0.05 | 1.80 | 0.016 | 0.003 | 0.033 | 0.06 | 0.0031 | — | — | — | — | 0.003 | | 2.83 | |
| U | 0.070 | 0.15 | 1.15 | 0.022 | 0.002 | 0.041 | 0.04 | 0.0030 | — | — | — | 0.80 | 0.003 | | 2.35 | |
| V | 0.073 | 0.08 | 1.83 | 0.022 | 0.003 | 0.040 | 0.03 | 0.0093 | — | — | — | — | 0.003 | | 2.83 | |
| a | 0.080 | 0.11 | 1.50 | 0.017 | 0.003 | 0.032 | 0.14 | 0.0020 | — | — | — | — | 0.004 | 1.6 | 2.22 | Comparative steel |
| b | 0.043 | 0.05 | 2.30 | 0.017 | 0.003 | 0.044 | 0.06 | 0.0022 | — | — | — | — | 0.004 | | 2.63 | |
| c | 0.090 | 0.21 | 1.88 | 0.055 | 0.003 | 0.046 | 0.04 | 0.0030 | — | — | — | — | 0.004 | | 2.58 | |
| d | 0.115 | 0.14 | 2.11 | 0.020 | 0.003 | 0.055 | 0.05 | — | — | — | — | — | 0.003 | | 2.87 | |
| e | 0.140 | 0.40 | 2.10 | 0.022 | 0.002 | 0.044 | 0.05 | 0.0030 | — | — | — | — | 0.004 | | 3.04 | |
| f | 0.100 | 0.11 | 2.30 | 0.022 | 0.002 | 0.044 | 0.03 | 0.0030 | — | — | 0.61 | — | 0.004 | | 2.99 | |
| g | 0.158 | 0.28 | 2.14 | 0.016 | 0.003 | 0.038 | 0.04 | 0.0020 | — | — | — | — | 0.004 | | 3.13 | |
| h | 0.120 | 0.06 | 2.30 | 0.022 | 0.002 | 0.044 | 0.03 | 0.0030 | — | — | 0.40 | 0.15 | 0.004 | | 3.03 | |
| i | 0.080 | 0.15 | 2.58 | 0.022 | 0.002 | 0.044 | 0.02 | 0.0030 | — | — | — | — | 0.004 | | 3.05 | |
| j | 0.130 | 0.05 | 2.20 | 0.017 | 0.002 | 0.043 | 0.03 | 0.0020 | — | — | — | — | 0.003 | 2.6 | 3.39 | |
| k | 0.120 | 0.11 | 2.00 | 0.017 | 0.002 | 0.043 | 0.10 | 0.0030 | — | — | 0.40 | — | 0.003 | | 3.16 | | underlined value: outside the scope of the invention

After pickling the hot-rolled steel plate, the steel plate was cold-rolled at various rolling reduction ratios to provide a base plate for plating (steel base material) having a thickness of 2.6 mm or 1.6 mm, which was passed in a continuous hot-dip plating line. The base plate for plating was annealed at various temperatures of from 730 to 850° C. in a hydrogen-nitrogen mixed gas atmosphere and cooled to approximately 420° C. at various cooling rates. Thereafter, the steel plate was immersed in a hot-dip Zn—Al—Mg based alloy plating bath having the following bath composition without exposing the surface of the steel plate to the air, and then the steel plate was withdrawn from the bath and regulated for the plating weight to approximately 90 g/m² per one surface by a gas wiping method, thereby producing a hot-dip Zn—Al—Mg based alloy plated steel plate, which was used as a specimen. The plating bath temperature was approximately 410° C.

The plating bath composition was as follows.

Al: 6%, Mg: 3%, Ti: 0.002%, B: 0.0005%, Si: 0.01%, Fe: 0.1%, all in terms of percentage by mass, with the balance of Zn The production conditions for the respective steel species are shown in Table 4. In the production conditions, the annealing temperature means the heating temperature for annealing in the hot-dip plating line, and the cooling rate after annealing means the average cooling rate from 740° C. to 650° C. (when the heating temperature is less than 740° C., from the heating temperature to 650° C.) obtained from the cooling temperature curve after annealing.

The plated steel plate as the specimen was subjected to the following investigations.

Tensile Characteristics

A test piece according to JIS No. 5, which was collected in such a manner that the longitudinal direction of the specimen was perpendicular to the rolling direction of the base plate for plating (steel base material), was measured for the tensile strength TS and the total elongation T.El according to JIS Z2241.

Bending Test

A test piece, which was collected in such a manner that the longitudinal direction of the specimen was perpendicular to the rolling direction of the base plate for plating (steel base material), was subjected to a 45° V-block bending test. After performing the test, the bent portion was visually observed from the outside thereof, and the minimum tip radius that did not suffer cracking was calculated as the limiting bending radius R. A specimen having a limiting bending radius R of 2.0 mm or less was designated as passed.

Metal Structure

The cross sectional surface in parallel to the rolling direction and the thickness direction (L cross section) was observed with a scanning electron microscope. All the specimens exhibited a metal structure containing ferrite as the main phase and martensite, or martensite and bainite as the second phase. Ten viewing fields were subjected to image analysis to obtain the area ratio of the second phase. The average crystal grain diameters (circle equivalent diameters) of the ferrite and the second phase were obtained from the image observation.

Evaluation of Liquid Metal Embrittlement Cracking Property

The evaluation was performed by the welding test in the following manner.

FIG. 1 is an illustration schematically showing an appearance of a welded structural member that is welded for evaluating the liquid metal embrittlement cracking property. A boss (protrusion) 1 having a diameter of 20 mm and a length of 25 mm formed of a steel bar (SS400 according to JIS) was placed perpendicularly on the center portion of a test piece 3 having a dimension of 100 mm×75 mm cut out from the specimen (plated steel plate), and the boss 1 and the test piece 3 were joined by arc welding. The welding wire used was YGW12. The welding operation was performed from the welding start point, and after a weld bead 6 went around the boss 1 and passed the welding start point, the welding operation was further continued slightly and completed after forming a weld bead overlapping portion 8. Hereinafter, the welding operation is referred to as boss welding. The boss welding conditions were as follows.
Welding current: 110 A
Arc voltage: 21 V
Welding speed: 0.4 m/min
Welding wire: YGW12
Shielding gas: $CO_2$, flow rate: 20 L/min FIG. 2 is a cross sectional view schematically showing a fixing method of the test piece in the boss welding. The test piece 3 subjected to the boss welding had been fixed in advance to a center portion of a fixing plate 4 (SS400 according to JIS) having a dimension of 120 mm×95 mm×4 mm in thickness by welding at the whole circumference thereof. The test piece 3 was fixed along with the fixing plate 4 to a horizontal laboratory table 5 with a clamp 2, and the boss welding was performed in this state.

After performing the boss welding, the assembly of the boss 1, the test piece 3 and the fixing plate 4 was cut on a cut surface 9 passing through the center axis of the boss 1 and the weld bead overlapping portion 8 as shown by the dashed line in FIG. 1, and the cut surface 9 was observed with a microscope to measure the maximum cracking depth (maximum cracking depth of the base material) observed in the test piece 3. In the test, welding was performed under very severe conditions for facilitating the detection of the formation of liquid metal embrittlement cracking. A plated steel plate (specimen) that exhibits a maximum cracking depth of 0.1 mm or less in this test may be determined as having characteristics that provide practically no problem in liquid metal embrittlement cracking property. Accordingly, a specimen that exhibited a maximum cracking depth of 0.1 mm or less was evaluated as ○ (good resistance to liquid metal embrittlement cracking), and a specimen other than that was evaluated as × (poor resistance to liquid metal embrittlement cracking).

Evaluation of Corrosion Resistance in Welded Portion

Test pieces having a dimension of 100 mm×100 mm were collected from the specimen, and two test pieces were joined to each other under the following welding conditions by lap fillet arc welding as schematically shown in FIG. 3. The welding conditions for the evaluation of corrosion resistance were as follows.

Welding current: 110 A
Arc voltage: 20 V
Welding speed: 0.7 m/min
Welding wire: YGW14
Shielding gas: Ar-20% by volume $CO_2$, flow rate: 20 L/min Thereafter, the surface conditioning and the phosphate treatment were performed under the conditions shown in Table 2, and cationic electrodeposition coating was performed under the conditions shown in Table 3. The test piece having the cationic electrodeposition coating was subjected to a fatigue test under test conditions of a stress of 50 N/mm² in the direction perpendicular to the welding direction and a number of tests of $1\times10^5$ for simulating fatigue by vibration, and then subjected to a cyclic corrosion test (CCT) under the conditions shown in Table 4 for evaluating the presence of formation of red rust after 250 cycles of CCT. A specimen that had no red rust found in the welded portion was evaluated as ○ (good corrosion resistance), and a specimen other than that was evaluated as × (poor corrosion resistance).

TABLE 2

Conditions for surface conditioning and phosphate salt treatment

| Surface conditioning | Treating liquid | Fulvalene X, produced by Nihon Parkerizing Co., Ltd. |
|---|---|---|
| | Temperature of treating liquid | 40° C. |
| | Immersion time | 30 sec |
| Phosphate salt treatment | Treating liquid | Palbond L15C, produced by Nihon Parkerizing Co., Ltd. |
| | Temperature of treating liquid | 40° C. |
| | Immersion time | 2 min |
| | Attached amount | 2 g/m² |

TABLE 3

Conditions for cationic electrodeposition coating

| Paint | epoxy resin (Powertop U Excel 250, produced by Nippon Paint Co., Ltd.) |
|---|---|
| Baking temperature | 140° C. |
| Baking time | 20 min |
| Thickness | 20 μm |

The evaluation results are shown in Table 4. FIG. 5 shows the relationship between the liquid metal embrittlement cracking sensitivity index, H value, determined by the expression (1) and the maximum base material cracking depth.

TABLE 4

| | | Production conditions | | | Metal structure | | Tensile characteristics | | Limiting bending | Maximum base material | Corrosion resistance | |
| | | Cold rolling reduction (%) | Annealing temperature (° C.) | Cooling rate after annealing (° C./sec) | Second phase Average crystal grain diameter (μm) | Area ratio (%) | TS (MPa) | T. El (%) | radius R (mm) | cracking depth (mm) | in welded portion | Note |
|---|---|---|---|---|---|---|---|---|---|---|---|---|
| No. | Steel | | | | | | | | | | | |
| 1 | A | 65 | 800 | 8 | 6.4 | 36 | 995 | 16.0 | 2.0 | 0.05 | ○ | Inventive example |
| 2 | B | 55 | 810 | 8 | 5.2 | 28 | 832 | 21.9 | 1.0 | 0 | ○ | |
| 3 | C | 60 | 800 | 6 | 5.5 | 25 | 820 | 21.0 | 1.0 | 0 | ○ | |
| 4 | D | 55 | 820 | 8 | 4.8 | 24 | 811 | 21.1 | 1.0 | 0 | ○ | |
| 5 | E | 60 | 820 | 10 | 5.3 | 39 | 1080 | 14.3 | 2.0 | 0.04 | ○ | |
| 6 | F | 65 | 790 | 10 | 5.6 | 26 | 853 | 21.5 | 1.0 | 0 | ○ | |

TABLE 4-continued

| | | Production conditions | | Cooling | Metal structure | | Tensile characteristics | | Limiting bending | Maximum base material | Corrosion resistance | |
|---|---|---|---|---|---|---|---|---|---|---|---|---|
| | | Cold rolling reduction | Annealing temperature | rate after annealing | Second phase Average crystal grain diameter | Area ratio | TS | T. El | radius R | cracking | in welded | |
| No. | Steel | (%) | (° C.) | (° C./sec) | (μm) | (%) | (MPa) | (%) | (mm) | depth (mm) | portion | Note |
| 7 | G | 65 | 810 | 8 | 4.4 | 21 | 870 | 20.5 | 0.5 | 0 | ○ | |
| 8 | H | 60 | 800 | 8 | 5.5 | 23 | 820 | 21.1 | 1.0 | 0 | ○ | |
| 9 | I | 60 | 850 | 10 | 3.2 | 18 | 880 | 20.6 | 0.5 | 0 | ○ | |
| 10 | J | 45 | 830 | 10 | 4.8 | 33 | 1033 | 16.3 | 2.0 | 0.04 | ○ | |
| 11 | K | 60 | 800 | 8 | 3.6 | 17 | 844 | 22.1 | 0.5 | 0 | ○ | |
| 12 | L | 60 | 810 | 10 | 7.3 | 25 | 855 | 19.5 | 1.5 | 0 | ○ | |
| 13 | M | 60 | 800 | 8 | 5.8 | 28 | 820 | 20.3 | 1.0 | 0 | ○ | |
| 14 | N | 60 | 800 | 8 | 6.2 | 40 | 1050 | 14.6 | 2.0 | 0.03 | ○ | |
| 15 | O | 60 | 800 | 8 | 6.4 | 39 | 990 | 16.5 | 2.0 | 0.04 | ○ | |
| 16 | P | 60 | 780 | 8 | 5.1 | 22 | 833 | 20.2 | 1.0 | 0 | ○ | |
| 17 | Q | 60 | 790 | 8 | 5.0 | 25 | 823 | 21.0 | 0.5 | 0 | ○ | |
| 18 | R | 65 | 780 | 8 | 5.8 | 23 | 782 | 21.0 | 1.0 | 0.05 | ○ | |
| 19 | S | 60 | 830 | 8 | 4.8 | 28 | 788 | 20.5 | 1.0 | 0 | ○ | |
| 20 | T | 65 | 820 | 10 | 3.9 | 28 | 785 | 19.9 | 0.5 | 0.03 | ○ | |
| 21 | U | 60 | 790 | 8 | 5.5 | 23 | 830 | 20.0 | 1.0 | 0 | ○ | |
| 22 | V | 60 | 790 | 8 | 5.5 | 30 | 888 | 18.1 | 1.0 | 0 | ○ | |
| 23 | a | 45 | 840 | 8 | 3.8 | 18 | 788 | 11.0 | <u>4.0</u> | 0 | ○ | Comparative example |
| 24 | b | 60 | 820 | 8 | 6.3 | <u>13</u> | <u>721</u> | 24.0 | 1.0 | 0 | ○ | |
| 25 | c | 60 | 800 | 8 | 5.8 | 21 | 798 | 18.0 | <u>2.5</u> | 0 | ○ | |
| 26 | d | 65 | 810 | 8 | 5.6 | 23 | 802 | 20.3 | 1.5 | <u>1.6</u> | ○ | |
| 27 | e | 55 | 820 | 8 | 5.5 | 40 | 1060 | 13.2 | 2.0 | <u>0.3</u> | ○ | |
| 28 | f | 60 | 800 | 8 | 5.2 | 43 | 1130 | 10.2 | 2.0 | <u>0.2</u> | ○ | |
| 29 | g | 60 | 800 | 8 | 5.0 | 42 | 1110 | 10.2 | <u>2.5</u> | <u>0.3</u> | ○ | |
| 30 | h | 50 | 800 | 8 | 5.7 | 32 | 1099 | 12.2 | 2.0 | <u>0.3</u> | ○ | |
| 31 | i | 60 | 810 | 8 | 6.2 | 28 | 930 | 14.0 | <u>2.5</u> | <u>0.2</u> | ○ | |
| 32 | j | 55 | 800 | 8 | 5.8 | 33 | 922 | 17.2 | 2.0 | <u>1.2</u> | ○ | |
| 33 | k | 50 | 840 | 8 | 4.2 | 35 | 1030 | 14.3 | 2.0 | <u>0.8</u> | ○ | |
| 34 | A | <u>35</u> | 790 | 8 | <u>8.8</u> | 33 | 965 | 16.0 | <u>2.5</u> | 0.05 | ○ | |
| 35 | A | 55 | <u>730</u> | 8 | 6.2 | 30 | 982 | 10.5 | <u>4.0</u> | 0.05 | ○ | |
| 36 | A | 60 | 800 | <u>4</u> | <u>8.6</u> | 29 | 920 | 15.7 | <u>2.5</u> | 0.05 | ○ | | underlined value: outside the scope of the invention or insufficient characteristics All the specimens according to the invention had a tensile strength TS of 780 MPa or more, a limiting bending radius R of 2 mm or less, a maximum base material cracking depth of 0.1 mm or less, and an evaluation of ○ for the corrosion resistance in the welded portion. Accordingly, a plated steel plate excellent in the strength, the bending property, the resistance to liquid metal embrittlement cracking, and the corrosion resistance in the welded portion was achieved.

On the other hand, No. 23 exhibited poor bending property due to the large Ti content; No. 24 exhibited insufficient strength due to the small C content; No. 25 exhibited poor bending property due to the large P content; No. 26 exhibited a large maximum base material cracking depth due to the small B content; and Nos. 27 and 28 exhibited a large maximum base material cracking depth due to the high H value. No. 29 exhibited poor bending property and a large maximum base material cracking depth due to the large C content and the high H value. No. 30 exhibited a large maximum base material cracking depth due to the high H value; and No. 31 exhibited poor bending property and a large maximum base material cracking depth due to the large Mn content and the high H value. Nos. 32 and 33 exhibited a large maximum base material cracking depth due to the high H value. No. 34 exhibited insufficient refinement of the crystal grain diameter of the second phase and poor bending property due to the small reduction in cold rolling. No. 35 exhibited poor bending property due to the low annealing temperature in the continuous hot-dip plating line. No. 36 exhibited insufficient refinement of the crystal grain diameter of the second phase and poor bending property due to the small cooling rate after annealing in the continuous hot-dip plating line.

REFERENCE SIGNS LIST 1 boss
2 clamp
3 test piece
4 fixing plate
5 laboratory table
6 weld bead
7 weld bead at whole circumference of welded portion of test piece
8 overlapping portion of weld bead
9 cut surface
18 plated steel plate
19 weld bead

The invention claimed is:
1. A high-strength plated steel plate for a weldedstructural member, comprising a steel base material having on a surface thereof a hot-dip Zn—Al—Mg based alloy plated layer, the steel base material containing from 0.050 to 0.150% of C, from 0.001 to 0.25% of Si, from 1.00 to 2.50% of Mn, from 0.005 to 0.050% of P, from 0.001 to 0.020% of S, from 0.005 to 0.100% of Al, from 0.01 to 0.10% of Ti, from 0.0005 to 0.0100% of B, from 0 to 0.10% of Nb, from 0 to 0.10% of V, from 0 to 1.00% of Cr, from 0 to 1.00% of Mo, and 0.001 to 0.005% of N, all in terms of percentage by mass, with the balance of Fe and unavoidable impurities, having a chemical composition in which relationship between the contents of the alloy elements and a thickness t (mm) of the steel base material is regulated so as to obtain an H value defined by the following expression (1) of 2.9 or less, and having a metal structure containing a ferrite phase and a second phase having an area ratio of 15% or more and less than 45%, the second phase being constituted by martensite or by martensite and bainite, and the second phase having an average crystal grain diameter of 8 µm or less:

$$H \text{ value} = C/0.2 + Si/5.0 + Mn/1.3 + Cr/1.0 + Mo/1.2 + 0.4t - 0.7 \ (Cr+Mo)^{1/2} \quad (1)$$

wherein in the expression (1), the element symbols each represent the content of the corresponding element in the steel in terms of percentage by mass.

2. The high-strength plated steel plate for a welded structural member according to claim 1, wherein the hot-dip Zn—Al—Mg based alloy plated layer has a composition containing from 3.0 to 22.0% of Al, from 0.05 to 10.0% of Mg, from 0 to 0.10% of Ti, from 0 to 0.05% of B, from 0 to 2.0% of Si, and from 0 to 2.0% of Fe, all in terms of percentage by mass, with the balance of Zn and unavoidable impurities.

* * * * *